March 10, 1970   F. L. CALHOUN   3,500,053
CONTAINER INSPECTION DEVICE WITH TRANSVERSE DUAL SCAN
UTILIZING ROTATING RETICLE AND PLURALITY OF
CONCENTRIC PHOTOCELLS
Filed June 4, 1968   2 Sheets-Sheet 1
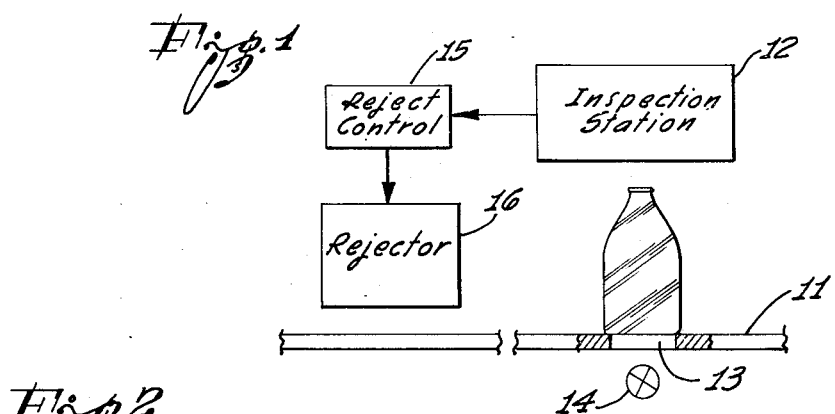
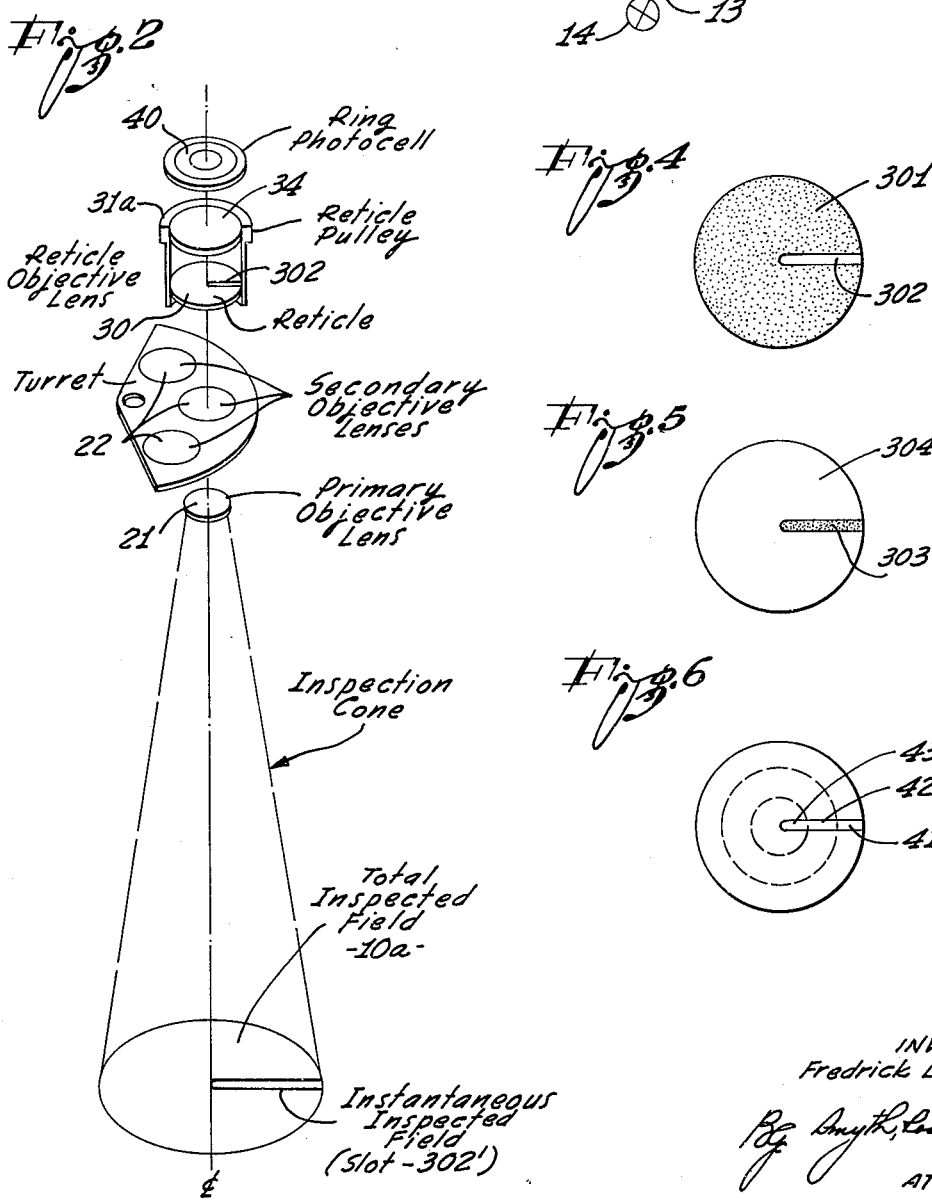
INVENTOR:
Fredrick L. Calhoun
ATTORNEYS

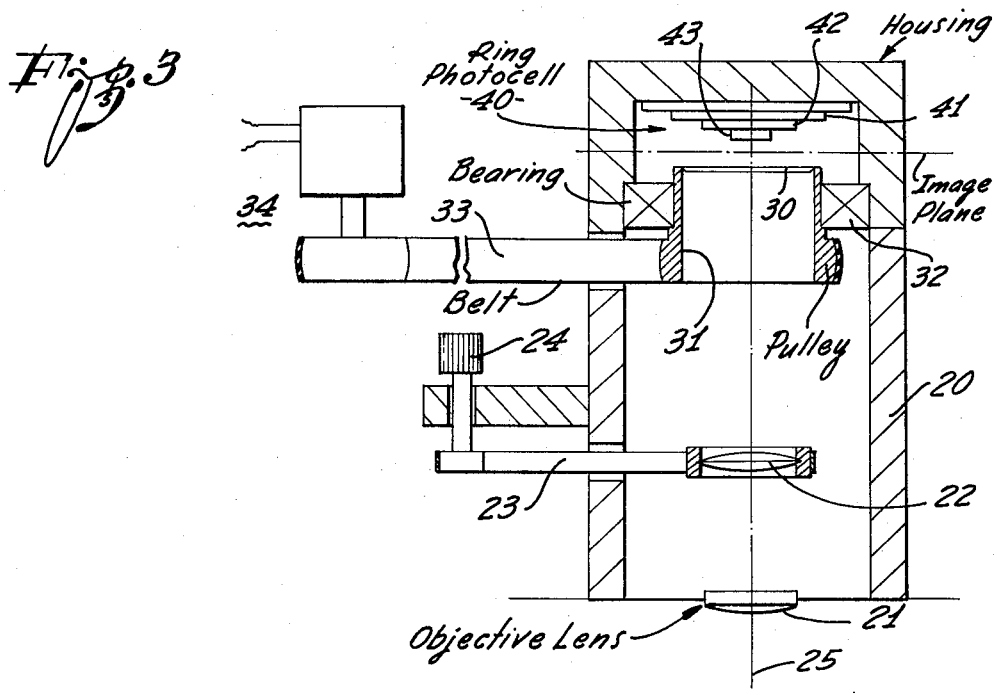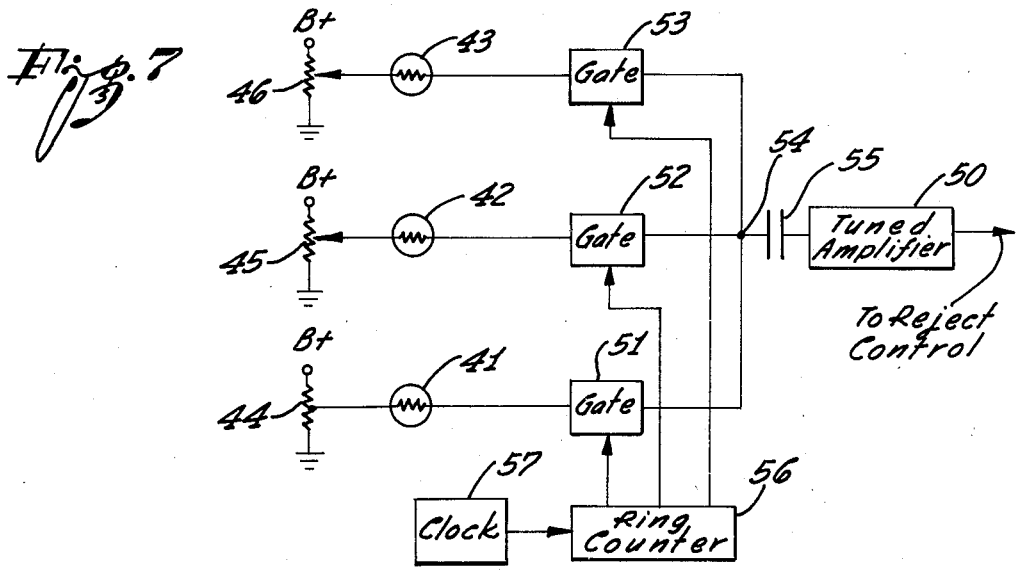

United States Patent Office 3,500,053
Patented Mar. 10, 1970

3,500,053
CONTAINER INSPECTION DEVICE WITH TRANSVERSE DUAL SCAN UTILIZING ROTATING RETICLE AND PLURALITY OF CONCENTRIC PHOTOCELLS
Fredrick L. Calhoun, Torrance, Calif., assignor to Automatic Sprinkler Corporation of America, Cleveland, Ohio, a corporation of Ohio
Filed June 4, 1968, Ser. No. 734,422
Int. Cl. G06m 7/04
U.S. Cl. 250—223       15 Claims

ABSTRACT OF THE DISCLOSURE

As an example for a container inspection apparatus, there is disclosed a device in which the bottom of a container is observed by a concentrical ring-shaped photocell and through a rotating reticle with a radial spoke. The photocells are sequenced at a high rate, and the modulation of a common output at that frequency is detected.

---

The present invention relates to an apparatus for inspecting containers such as bottles for cleanliness. When bottles or other, preferably transparent, devices are photoelectrically scanned, small particles of foreign matter are generally difficult to detect. Systems are known employing a rotating reticle as part of a photoelectric scanning means to facilitate the detection of small foreign particles. The reticle intercepts the light from the illuminated container to a photocell which also forms part of the photoelectric scanning system. The reticle is made of alternate opaque and transparent areas which are successively interposed between any foreign particles in the container and the photocell.

The electrical output of the photocell accordingly is an alternating signal having a frequency related to the rotating speed of the reticle and the number of alternate, opaque and transparent areas of the reticle. If foreign particles are not present in the bottle, the output of the photocell is substantially a direct current. In order to avoid nonuniform sensitivity as to the area to be inspected, an improved system has been suggested according to which the instantaneous field of observation as defined in the field to be inspected by the dimensions of the rotating reticle or by aperture means in the optical path, is caused to nutate. Systems of this type operate very satisfactorily, particularly for detecting small, clearly identifiable foreign particles. However, problems have arisen if there are dirt patches or other large particles on the bottom of the bottle. In such case, little modulation is provided by the rotating reticle.

In general, the photo detector "sees" the illuminated bottle bottom through the rotating reticle whereby the opaque portions thereof serve as position variable light stops to block at any instant light from a portion of the illuminated field from reaching the photocell. If a portion of a large dirt patch is seen by the cell, while another portion thereof is not seen by the cell, the rotation of the reticle may not or very little change the total light intensity as received by the photocell. As a portion of that patch gradually enters the viewing range, another portion may become gradually covered by an opaque reticle spoke so that the overall light intensity received by the cell varies very little.

Another situation arises in which, for example, two small particles are arranged so that one, as seen by the photocell, is covered at a particular instant by an opaque portion of the reticle, while another particle is "seen" directly through a transparent portion of the reticle. Shortly thereafter the situation may be reversed again, resulting in no significant change in illumination intensity. The probability of occurrence can be reduced by selecting a reticle with a large number of opaque translucent sectors. However, such a selection decreases the sensitivity of a system in regard to a detection of a large patch as described. It is the principal object of the invention to eliminate these above-described self-canceling effects resulting from large particles, or from particular positions of small particles.

The system, in accordance with the invention, is constructed to operate with a reticle where the opaque area or areas of the reticle differ in size essentially from the remaining transparent area or areas thereof. To state it differently, the ratio between opaque and transparent portions differs materially from unity, preferably by one order of magnitude. For example, a reticle can be a transparent disk with a small opaque, radially extending bar, or it can be an opaque disk with a small radially extending translucent or transparent bar. The reticle rotates in the light path between the inspection field and photoelectric detection means. The dimensions are so chosen that the total inspection field, e.g., the entire bottle bottom is inspected through the reticle solely by its rotation. In other words, a point of the transparent portion through which the photoelectric detector "sees" the inspection field and being farthest from the axis of rotation of the reticle outlines the total inspection field, there being no additional nutation involved. The photoelectric detector is comprised of a plurality of detector elements concentrically arranged with reference to the axis of rotation of the reticle.

The photocells or detector elements have preferably ring-shaped configuration and their outputs are sequenced at a high rate for processing by a single channel. The sequencing rate is very high in relation to the rotational frequency of the reticle. The sequencing can be obtained, for example, in that each of the concentrically arranged photo detectors is sensitive on a continuous basis, but their outputs are sampled sequentially at discrete intervals.

The sampled output signals are all fed into a common channel, such that a uniform illumination field as observed by the several photo detectors results in a constant output signal in spite of the sequencing. If any of the photocells observes a foreign particle, its light input, and, therefore, its electrical output is reduced in relation to the output as provided by the detector sampled just before, and the output of the detector sampled next within the sampling sequence. As a consequence, the signal in the common channel has an A-C component having frequency equal to the sampling and sequencing rate. Detection of foreign particles, therefore, is possible by determining the amplitude of the A-C component having the sampling rate frequency in a common signal channel. The detectors are preferably sampled on a cyclic basic, using as many cycles as needed during the period the entire inspection field has been passed over at least once by the projection of an opaque-transparent boundary of the reticle.

A characteristic reticle modulation frequency can be defined by the rotational frequency of the reticle multiplied by a factor which is given by the ratio of $2\pi$ and the average or smallest sector angle of the smaller one (as to sector angle) of two adjacent opaque and transparent reticle areas, sector angle being understood in relation to the axis of rotation of the reticle. That frequency determines the bandwidth of modulation of the sequencing frequency at which the photo detector system output is processed. The bandwidth for the output is very narrow and is essentially given by the reticle structure and its rotational frequency. If the ratio between the sampling frequency and the reticle frequency is high, the signal in the common output channel has a very narrow bandwidth, which is instrumental for obtaining good noise rejection capabilities.

The scanning system thus divides the inspection area into two diffrent patterns of subareas, and scanning proceeds within each pattern sequentially and on a cyclic basis, whereby the scanning within the two patterns progresses transverse to each other, each pattern covering the entire inspection field. Orthogonality is desirable for avoiding beat frequency modulation. The rotating reticle provides an azimuthal sequencing pattern for purposes of inspecting the entire inspection field, thereby providing modulation as to any foreign particles in the illumination field. The sequencing of sampling the concentrically arranged photocells provides a radial sequencing pattern of inspection. By selecting different sampling frequencies in that manner, one obtains a narrow bandwidth for the information in the single output channel. The overall sensitivity of the system is to a considerable extent independent from the size of the foreign particles or patches to be detected. In view of the orthogonality of the two sequencing directions as covering the entire inspection field, dead zones are avoided.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawing, in which:

FIGURE 1 illustrates schematically a container inspection and rejection system in which the invention is practiced;

FIGURE 2 is a schematic perspective view of the optical system for an inspection station in accordance with the preferred embodiment of the present invention;

FIGURE 3 is a cross section through a portion of the inspection station having the elements shown in FIGURE 2;

FIGURES 4 and 5 show two examples for reticles;

FIGURE 6 shows the instantaneous inspection field as projected onto the photo detectors of FIGURES 2 and 3; and FIGURE 7 is a circuit diagram for processing of the signals developed by the photo detectors shown in FIGURES 2 and 3.

Proceeding now to a detailed description of the drawings, FIGURE 1 thereof shows schematically the principal layout of a system in which the preferred embodiment of the invention is practiced. A container, such as a glass bottle 10, is transported on and by a conveyor belt 11 past an inspection station 12. The conveyor belt 11 may be completely transparent or it may have transparent portions, such as window 13, to permit illumination of the bottom of container 10 through the belt by means of a lamp 14.

As the container 10 passes the inspection station 12, the illuminated bottle, particularly the bottom thereof, is observed. If the inspection station finds foreign particles on the container, it provides a detector signal to a reject control circuit 15. The reject control circuit 15 may include suitable signal storage facilities for bridging the period between the time container 10 has passed through the range of inspection station 12 and the time the container has arrived at the operating range of a rejecting mechanism 16. The rejecting mechanism 16 essentially separates clean containers from those wherein the inspection station found foreign particles. A container separating or eject control device is, for example, disclosed in my Patent 3,270, 881.

Turning now to FIGURES 2 and 3, there is illustrated somewhat schematically the layout and arrangement of the principal elements of which the inspection station 12 is constituted. As a result of the illumination of the container by means of lamp 14, the inspection station "sees" that illuminated bottom through the open neck of the bottle as a total inspection field 10a. It will be observed that the particular position of the bottom of the bottle, i.e., the particular position of the area to be inspected varies in relation to the stationary inspection station 12, due to the advance of the conveyor belt 11 and the container 10 thereon. Therefore, the total optically contemplated inspection field to be observed must be selected to be sufficiently large so that the actual bottom of the bottle moves and stays within the spection field during the inspection period or look time. However, the total period of inspection can be made so short that the total inspection field can be regarded as stationary.

If, for example, the conveyor belt moves at the rate of 26 inches per second, then, for example, during a period of 7.2 milliseconds the container will have moved by the small distance of 3/16" only. These numerical examples are chosen here only representatively and in order to better explain certain aspects of the invention.

The inspection station proper includes, for example, a housing 20 for an optical assembly, for projecting or imaging the illuminated inspection field onto a photoelectric detector system. Housing 20 may be mounted on a suitable support (not shown) in a manner to make housing 20 vertically adjustable so that its height above the conveyor belt 11 is variable. The optical system in housing 20 should always be as close as possible to the neck or opening of the container to be inspected, so that differently high containers require different vertical positions of station 20. Moreover, different types of containers may differ in diameter, i.e., the inspection field 10a can vary in size. As a consequence, different containers present different optical conditions. On the other hand, and for reasons below, the size of the image of the projected inspection field should remain the same. Thus, the optical system in housing 20 must be capable of producing different magnification ratios.

In the bottom portion of housing 20 there is a primary objective lens 21, the optical axis 25 of which defines the central position of the inspection field, i.e., during the inspection period optical axis 25 will essentially traverse the center of the bottom of the bottle to be inspected. In other words, the center of the container will pass through (or come closest) to the axis 25 in about the middle of the inspection period.

A secondary lens 22 is mounted on a turret 23 which is rotatably positioned and adjustable by means of a knob 24. The turret holds a plurality of secondary lenses, and either of them can be placed in optical alignment with primary lens 21 to complete therewith an imaging system having imaging plane 40'. As the position of the image plane inside the housing and the image size should not vary with different containers, different secondary lenses are being used in order to change the focal length and/or the magnification of the projection system. The optical system in its entirety can be changed, by changing secondary lenses, to assume different magnification ratios and to operate with different object distances, due to vertical adjustment of the housing, so as to accommodate the system to differently high and/or differently wide containers.

A reticle 30 is mounted in a hollow pulley 31 which is journaled in housing 20 by means of a bearing 32. Pulley 31 is driven by a belt 33 through a drive system 34 which may include a suitable motor, gear means, etc. Suitable reticles are illustrated in FIGURES 4 and 5. The reticle may, for example, be an essentially opaque disk 301 with a radially positioned, transparent slot 302 extending slightly from beyond the center of the disk to the periphery thereof. The reticle is mounted in hollow pulley 31 such that the center of the reticle runs through the axis of rotation of pulley 31 which, in turn, coincides with the optical axis 25 of the inspection station. FIGURE 5 illustrates an alternative reticle comprised of an opaque, single spoke 303 on an otherwise transparent disk 304. One can seen that the two reticles of FIGURE 4 and FIGURE 5 are optically complementary.

As shown in FIGURE 3, the pulley is mounted so that the reticle is positioned rather close to the image plane 40' of the optical system, as defined by the primary lens 21 and any of the secondary lenses in the turret for any of the pertinent and possible object distances. The photoelectrical detector system 40 is likewise mounted close to that image plane. Optimum relations would exist if detector plane, image plane and reticle plane coincide. However, there is relative movement between the reticle and the detector, so that they must be spaced apart, and the image plane will be located between them as illustrated in FIGURE 3.

The photoelectric detector system 40 is comprised of, for example, three concentrically arranged photocells 41, 42 and 43 respectively. These photocells may actually all be disks, but they have different diameters, and they are superimposed so that the smaller ones shadow to some extent the larger ones. Thus, the relatively large disk-shaped photocell 41 has its central region covered by the somewhat smaller disk-shaped photocell 42 so that only a ring-shaped portion of photocell 41 remains exposed. The disk-shaped cell 42, in turn, is partially covered by a centrally located disk of still smaller diameter, namely, cell 43, leaving again only a small ring-shaped area of photocell 42 exposed. The relative sizes of these cells are not critical, their radii or diameters could be related by the relationship 1:2:3. The size of the image produced is essentially determined by the outer diameter of disk 41. As it is desirable to utilize the exposed surface of photocell 41 fully, the size of the image of the inspection field as projected by the effective optical system should always be about the same.

The schematic drawing of FIGURE 2 illustrates a modification. Here the reticle is spaced apart from the ring detector system 40, and the pulley, denoted here 31a, includes another lens, 34. The image plane for the optical system as comprised of lenses 21 and 22 may now always precisely coincide with the reticle plane and lens 34 images the (intermediate) image in the reticle plane and the superimposed reticle onto the detector system 40.

Assuming the reticle to be as shown in FIGURE 4, the instantaneous field of inspection will be the narrow area 302', which outlines narrow, radially extending area corresponding to a hypothetical projection of slot 302 into the object field 10a by the optical system 21–22. The three ring cells together observe only the portion 302' of the total inspection field 10a. FIGURE 6 illustrates schematically the projection of the inspection field through the reticle onto the three photocells, whereby narrow portions are outlined on each cell which are affected by the radiation. The major portion of each cell remains in the shadow of the opaque portion of the reticle.

As reticle 30 rotates, the instantaneous field 302' sweeps over the entire area 10a so that progressively the light from different portions of the field 10a reaches the detector system. After a complete revolution of the reticle, the entire field 10a has been scanned. Whenever a foreign particle is in the range as outlined by field 302' at any instant, the light will dim, and the radiant input for one or more of the cells is diminished, depending on size and degree of opaqueness of that particle.

FIGURE 7 illustrates the electric circuit of which the three photocells 41, 42 and 43 serve as the essential input signal generators. There are provided three resistors 44, 45 and 46 for respectively providing biasing potential to the three photocells. The photocells are, for example, solar cells made of a photovoltaic material, each being a PN semiconductor device with negative back surface and a positive front surface. The photocell 41, for example, is biased to a fixed voltage level as determined by the resistor 44. The two potentiometers 45 and 46 permit selection of bias for photocells 42 and 43 such that in case the total inspection field 10a is uniform, the photocells 41, 42 and 43 provide equal outputs.

It is readily ascertainable that in case the containers to be inspected have uneven bottom thicknesses, i.e., varia-ble degrees of transparency, the ring-shaped configuration of the photo detectors and the adjustability of the bias permits selection of particular bias for each cell so that in spite of such an uneven inspection field, as far as illumination output thereof is concerned, equal electric outputs will be produced by the three photocells. Moreover, if the image of a particular container has not diameter equal to the diameter of cell 41, the resulting loss in output of that cell can be balanced by adjusting resistors 45 and 46. This, however, does not dispense with the basic requirement that this image size produced should be essentially independent from the size of the bottle diameter. The balancing adjustment obtainable with the resistors 45 and 46 merely renders this optical requirement less critical as far as permissible tolerances are concerned.

The cells are respectively connected with their other ends to input terminals of electronic gates 51, 52 and 53 respectively, which, for example, may be FET-type switches; FET's provide high isolation when nonconductive and have a low noise figure. Each photocell-gate assembly can basically be operated in two types of circuit configuration. In one case, the gate, when enabled, serves as a means to apply operating potential to that side of the photocell which is not connected to the respective biasing resistor. In this case, sampling of a cell output concurs with rendering the cell operative as to production of an electric output, unless the cell is a photovoltaic one. If the cell is a photovoltaic one, or if the cell is permanently biased for operation, then the respectively associated gate is a mere transmission control element permitting or preventing passage of the signal as produced by the cell.

The signal output terminal of the gates lead to a common junction 54 and from there through a capacitor 55 to a tuned amplifier 50. The capacitor 55 blocks off the D-C components as provided by the photocells at any instant. Amplifier 50 is tuned to a particular frequency to be responsive only to particular A-C components of the signal as provided at any instant to the junction 54.

The three gates 51, 52 and 53 are, as far as their gating terminals are concerned, under control of a ring counter 56 which may be a cyclically operated binary counter set to obtain numbers 0, 1, 2 back to 0, etc., in cyclic repetition. Ring counter 56 operates the gates 51, 52 and 53 in cyclic sequence, but only one being enabled at any instant. The ring counter 56 receives clock pulses from a clock 57 having a frequency essentially equal to the frequency to which amplifier 50 is tuned. The gates 51, 52 and 53 are thus sequenced at clock pulse rate, i.e., the photocells are sequentially sampled at that rate and on a repetitive basis as determined by the counter cycle frequency which, of course, is equal to the clock pulse frequency divided by the number of photocells employed.

It can thus be seen that the detector system in general operates with two concurrently effective scanning patterns, each tending to scan the entire inspection area. The rotating reticle scans the inspection field optically and azimuthally, the sequencing of sampling the concentrically arranged ring-shaped detector cells causes the field to be scanned electrically and radially. The combination results in an output signal representing at any instant the illumination of a small area only and within the total inspection field. The small area determines the electrical signal at junction 54 and is progressively varied radially as well as azimuthally through the two scanning processes. The two scans are essentially independent from each other, though certain relationships have to be observed as will be discussed more fully below. The operation and operating conditions of the device as described will now be explained in further detail.

It will be appreciated that in case photocells 41, 42 and 43 provide equal outputs, D-C potential 54 is applied to junction 54 in spite of the fact that this D-C potential is progressively provided by the output of different gates, within the sequencing of the gates as controlled by the ring counter 56. There will be, of course, some switching spikes but the gates 51, 52 and 53 could be constructed to suppress these spikes. Moreover, these spikes have a considerable higher frequency than the frequency of the clock 57 to which amplifier 50 is tuned and the amplifier can, therefore, be tuned to reject them.

If the cells 41, 42 and 43 provide constant outputs, tuned amplifier 50 will provide an output signal which is essentially zero or whatever biasing level is provided in the output circuit of the tuned amplifier for zero A-C input. As illustrated schematically in FIGURE 7, tuned amplifier 50 feeds its output to the reset control device 15 (FIGURE 1) and in case of an essential constant input, the rejection control will not be triggered, i.e., the rejector 16 (FIGURE 1) will not be activated. Either the tuned amplifier, or the reject control 15 or both, should have a definite response or input signal threshold to reject spurious noise signals.

For a complete inspection of the bottom of a container it is necessary that the reticle makes at least one revolution. More than one revolution is not needed, and it should be observed that the necessity of having at least one revolution is a restriction on the speed with which the container can pass the inspection station. To ensure proper coverage of the entire container bottom, particularly at the edge thereof, the cells should be sequenced in that, for example, at least three cycles of ring counter 56 equal the time it takes the reticle to move over an angle equal to the outer width of the slot 302 (or bar 303 in case the reticle of FIGURE 5 is used). An integral relation is not necessary and a general operating condition can be stated as follows: If W is the rotating speed of the reticle, and if the spoke 302 has at the periphery an angle of $2\pi/N$ (N being of the order of $10^1$) then the cycle freqency of ring counter 56 should be larger than $2\pi W/N$, preferably considerably larger. The sampling rate (clock pulse frequency) is, of course, still higher accordingly. From a more general point of view, it is necessary that the two independent scanning processes progress at very different speeds to ensure full coverage of the inspection field, particularly because one of the scanning processes (the reticle) covers only a small area at any instant in order to eliminate the self-canceling effect.

Discussing the operation now in greater detail, one can readily see that foreign particles, when in the instantaneous inspection field, reduce the light intensity as detected by that particular photocell which responds at that instant to light from the subregion of the instantaneous inspection field in which the foreign particle is located. Therefore, when the particular associated gate (FIGURE 7) is enabled, the resulting output signal as provided to the junction 54 will be less than is provided during the preceding and during the suceeding enabling periods (clock pulse cycle) for the respective two other cell-gate channels. That drop will be the more pronounced the larger the particle is. The reticle slot should be as narrow as possible so that the probability that two foreign particles are located in areas scanned by different photocells but concurrently in the instantaneous inspection field, as defined, for example, by the reticle slot, is negligibly low. On the other hand, the reticle slot must not be too small so that the photocells operate above a sufficiently high noise level to provide a sufficiently strong, useful output.

Having selected, therefore, a comparatively high sequencing rate, one obtains a plurality of signal waves at the input of tuned amplifier 50 for each foreign particle. These waves have clock pulse frequency and their relative amplitude depends upon the size of the particle. The amplitude will also depend on the transparency of the particle that caused the dimming of the light as well as on the position of the particle, i.e., whether the particle dims the light received by only one cell or by two or even all three cells. If the sampling rate is high, each particle will produce a plurality of A-C waves in the detector circuit of amplifier 50. The higher the sampling rate, the longer is the wave train produced by each particle.

Thus, the high degree of inequality of the two scanning processes ensures that several, even many, wave trains are produced for each foreign particle to make sure it does not escape detection. No problems exist if the particles are relatively small and located in the range of one cell only, as long as the output signal of any cell drops sufficiently below the steady D-C level corresponding to a clean surface. A larger light dimming object extending in the range of two or even three cells may prevent effective A-C modulation at clock pulse frequency during some cycles, particularly when the projected reticle slot covers a large portion of a light dimming patch, but the principle of double scanning in an orthogonal pattern still avoids the above-mentioned canceling effect.

A large object, such as a large particle or a large patch will never have straight radially oriented boundaries so that at least for a few clock pulse cycles one cell obtains full light, another one dimmed light, the next one full light again, etc. A narrow reticle slot is instrumental in obtaining this result. The orthogonal double scan thus detects either small particles, per se, or the boundaries of a large particle or patch. The resulting, combined output signals will never change gradually from sample-to-sample period during the entire inspection cycle, unless the entire bottom is evenly soiled, for which case special provisions, such as a particular D-C level detector has to be provided.

In summary then, the large degree of dissimilarity of opaque and transparent reticle portions avoids signal canceling because of peculiarly located particles, and that reticle structure in conjunction with the two different scanning directions, avoids self-cancelation of signals resulting from a large light dimming object such as a patch. A considerable difference in the scanning rates ensures production of several, even many, wave trains upon detection of a foreign particle or of a patch boundary.

Assuming the width of the slot to be $\frac{1}{40}$ of the outer circumference, and assuming further that the reticle rotates at about 200 c.p.s., then a fundamental sequence rate of approximately 50 kc. is needed if three sample cycles equal the time it takes the reticle to advance by the slot width. The photocells themselves, of course, do not have to be responsive to illumination changes at that frequency as it is their output that is being sampled at that rate. For the given data, the highest output frequency which may occur in any photocell and resulting from a small particle located along the circumference of the outer rim of the bottle bottom, will produce approximately a 4 kc. signal as the projected slot passes over the particle. That frequency determines the bandwidth of the signals to which the tuned amplifier must be responsive. If the sampling frequency is 50 kc., the bandwidth is very narrow indeed, allowing the system to operate at very high noise rejection.

The two examples for a reticle as shown in FIGURES 4 and 5 are optically complementary, producing modulations which result in essentially the same output frequencies. In the case of FIGURE 4 the relative illumination drop resulting from a foreign particle when in the instantaneous inspection field of an individual cell and as compared with the illumination detected concurrently by the other cells, is relatively high, as the effective area of each cell receiving light at any instant is so small, so that even a small, foreign particle covers a significant portion thereof. On the other hand, the fact that at any instant a large portion of each cell is, in effect, covered by the opaque portion of the reticle, causes the output of the cell at any instant to be rather low, requiring high amplification in making the system accordingly more sensitive to noise. If a reticle as shown in FIGURE 5 is used, then the illumination received by any cell increases only by a small amount when a particle is covered by the projected bar, because a small particle covers only a relatively small portion of the effective area of any cell. However, the cells, in this case, provide very high overall outputs which require accordingly, considerably less amplification. Thus, one can operate with a lower threshold for noise suppression in the case of FIGURE 5 than in the case of FIGURE 4. This, in turn, results in similar overall performances for either reticle.

It should be mentioned, furthermore, as was mentioned in the introduction, that the specific geometric reticle configuration is of no importance to the invention whatsoever, as long as each portion of the surface to be inspected is passed over by the projection of a boundary between an opaque and a transparent reticle portion. Essential is that the ratio between opaque and translucent portions is very high. How this ratio is geometrically achieved is immaterial. A very large ratio of transparent and translucent portions of the reticle is primarily provided for the purposes of avoiding canceling effect within the double, orthogonally operating scanning scheme.

The invention is not limited to the embodiments described above, but all changes and modifications thereof not constituting departures from the spirit and scope of the invention are intended to be covered by the following claims:

What is claimed is:

1. A system for inspecting a container for particles of foreign matter;
    means disposed relative to the container for illuminating the container to provide an optical field of light modulated by the optical characteristics of the container and by any particle of foreign matter in the container;
    a plurality of concentrically disposed radiation sensitive means for observing said optical field of light;
    optical means for directing radiation from said illuminated inspection field to said radiation means;
    a reticle disposed in the path of said radiation as directed and having at least a first opaque and a second transparent region, the sizes of said first and second regions being considerably different;
    means coupled to the reticle for rotating said reticle at a particular rotational speed; and
    circuit means connected to the radiation sensitive means of the plurality for sequentially receiving output signals therefrom on a repetitive basis.

2. In a system, as set forth in claim 1, the sequencing frequency being larger than the rotational frequency of the reticle times the ratio of $2\pi$ to a representative angle dimension of the smaller one of the first and second regions.

3. In a system as set forth in claim 1, the reticle having as one of the first and second regions, a narrow angle-radial spoke within the remaining portion of the reticle forming the other one of the first and second regions.

4. In a system as set forth in claim 3, the circuit means including means tuned to the sequencing frequency, and providing a signal representative of presence of an A-C signal at that frequency.

5. In a system for inspecting a container for particles of foreign matter;
    first means disposed relative to the container for illuminating the container to provide an illuminated inspection field of the container modulated by any foreign particle in the inspection field;
    second means including a plurality of light sensitive means disposed to respectively observe different areas of the inspection field, and respectively producing electrical signals representative of the illumination of the respective areas;
    third means connected to the second means to receive sequentially the signals as provided by the second means corresponding to a sampling of illumination of the areas and providing a composite output signal;
    fourth means disposed to modulate the illumination as received by the second means corresponding to optically coupling progressive regions of said inspection field to the second means; and
    fifth means connected to the third means and being responsive to a particular A-C component of the combination signal.

6. In a system as set forth in claim 5, the second, third and fourth means operating in that with respect to any incremental area of the inspection field, the direction of modulation by the fourth means and the effective sequencing of the second means as provided by the third means proceed in different directions.

7. In a system as set forth in claim 6, the second means including a plurality of concentrically oriented light sensitive means, the fourth means including a reticle having at least one opaque and one transparent region oriented radially in respect to an axis running through the center of a said light sensitive means, and means for rotating the reticle about said axis.

8. In a system as set forth in claim 5, the fifth means being responsive to the signal having the sequencing frequency for the plurality of the second means, the effective modulation as provided by the fourth means having a smaller frequency than the sequencing frequency for the second means.

9. In a system for inspecting a container for particles of foreign matter;
    first means disposed relative to the container for illuminating the container to provide an illuminated inspection field of the container modulated by any foreign particle in the inspection field;
    second means including a plurality of light sensitive means disposed to respectively observe different areas of the inspection field and respectively producing electrical signals representative of the illumination of the respective areas;
    a reticle disposed in the optical path between the light sensitive means and the inspection field to modulate the light as received by each of the light sensitive means;
    third means coupled to the reticle for rotating the reticle about an axis in the optical path;
    fourth means connected to the second means to derive a signal train from the first means corresponding to cyclically repeated sequential sampling of each of the light sensitive means; and
    means connected to the fourth means to be responsive to a particular A-C component in said signal train.

10. In a system as set forth in claim 9, the reticle having a radially oriented narrow angle;
    first portion flanked by second portions of a larger angle in relation to the axis, one of the first and second portions being opaque, the respective other one(s) being transparent;
    the fourth means operating to run through a complete cycle within a period less than the time of rotating motion of the reticle over the angle of said first reticle portions.

11. In a system as set forth in claim 9, the reticle having radially oriented opaque and transparent areas, the ratio of the sizes of opaque to transparent areas being substantially different from unity.

12. In a system as set forth in claim 11, the light sensitive means being concentrically oriented in relation to the axis.

13. In a system for inspecting a container for particles of foreign matter;

first means disposed relative to the container for illuminating the container to provide an illuminated inspection field of the container modulated by any foreign particle in the inspection field;

second means for scanning the inspection field in two differently oriented, sequencing cycles, each covering progressive areas of the inspection field on a repetitive basis, the sequencing cycles having different sequencing frequencies and different cyclic repetition rates, the second means producing an electrical signal representative of the scanning; and means connected to be responsive to an A-C component in said signal, the higher one of the sequencing frequencies modulated in accordance with the modulation of illumination in the inspection field by any foreign particle therein.

14. In a system as set forth in claim 13, the differently oriented sequencing cycles operate orthogonal to each other in relation to the inspection field.

15. In a system as set forth in claim 13, one of the sequencing progresses radially, the outer one azimuthally in relation to the inspection field.

References Cited

UNITED STATES PATENTS

| | | | |
|---|---|---|---|
| 3,411,009 | 11/1968 | Ford et al. | 250—223 |
| 3,425,547 | 2/1969 | Madley | 250—223 |

ARCHIE R. BORCHELT, Primary Examiner

MARTIN ABRAMSON, Assistant Examiner

U.S. Cl. X.R.

250—218, 236